(12) United States Patent
Bowman et al.

(10) Patent No.: US 7,777,777 B2
(45) Date of Patent: Aug. 17, 2010

(54) SYSTEM AND METHOD FOR ACTIVE CALL MONITORING

(75) Inventors: Kevin Bowman, Austin, TX (US); James Lemieux, Austin, TX (US)

(73) Assignee: Tandberg Telecom AS, Lysaker (NO)

( * ) Notice: Subject to any disclaimer, the term of this patent is extended or adjusted under 35 U.S.C. 154(b) by 1734 days.

(21) Appl. No.: 10/424,310

(22) Filed: Apr. 28, 2003

(65) Prior Publication Data

US 2003/0202112 A1  Oct. 30, 2003

Related U.S. Application Data

(60) Provisional application No. 60/376,454, filed on Apr. 30, 2002.

(51) Int. Cl.
H04N 7/14 (2006.01)
H04L 12/16 (2006.01)

(52) U.S. Cl. .................... 348/14.08; 370/261

(58) Field of Classification Search ................. 370/261; 348/14.08
See application file for complete search history.

(56) References Cited

U.S. PATENT DOCUMENTS 6,804,451 B1 *  10/2004  Ko et al. ................. 386/83
7,046,636 B1 *  5/2006  Shaffer et al. ............ 370/252
2002/0082730 A1 *  6/2002  Capps et al. ............. 700/94
2003/0142201 A1 *  7/2003  Babka et al. ............. 348/14.09
2007/0126862 A1 *  6/2007  Even et al. .............. 348/14.08

* cited by examiner

*Primary Examiner*—Rasha S Al Aubaidi
(74) *Attorney, Agent, or Firm*—Oblon, Spivak, McClelland, Maier & Neustadt, L.L.P.

(57) ABSTRACT

A video call monitor manager creates a video call monitor engine for initiated video calls between plural video devices with the video call monitor engine having a monitoring thread for each video device of the video call, the monitor threads periodically polling their associated video devices for quality of service and state information to automatically detect quality of service threshold rule violations and state changes for broadcast to interested locations, such as video network administrators monitoring the video call. Each video call monitor engine monitors a video call state with a nested state machine structure of device state machines, device monitor state machines and call segment state machines nested to define a call state machine as a video call is initiated, with the call state machine monitoring the video call throughout its life so that interesting call state changes and quality of service changes are detected and broadcast to monitoring clients.

15 Claims, 6 Drawing Sheets

SYSTEM AND METHOD FOR ACTIVE CALL MONITORING

RELATED APPLICATIONS

This application claims priority to and incorporates by reference U.S. Provisional Application Ser. No. 60/376,454, entitled "Video Conferencing System", filed on Apr. 30, 2002.

BACKGROUND OF THE INVENTION

1. Field of the Invention

The present invention relates in general to the field of communications monitoring, and more particularly to a system and method of active monitoring of video devices in video calls.

2. Description of the Related Art

Over the past several years, video conferencing has gained acceptance as a way for businesses to conduct meetings. Compared with audio telephone conferences, video conferencing allows a more personal interaction between participants and supports visual presentation of information, such as by sharing presentations and documents. The quality of communication by video conferencing has steadily improved in recent years with the availability of greater communication bandwidth and information processing capability. This improved quality has encouraged businesses to invest in video communication devices and networks to support greater numbers of video conferences, both within the business and with customers outside of the business. One advantage for a business in investing in video conferencing capability is a reduction in travel costs with greater numbers of meetings occurring via video conferencing instead of in person. However, as the number of video calls and the complexity of video networks for a business increase, difficulties in use, scheduling and interoperability of video devices often arise. One key for a business to obtain the most possible return on an investment in video devices and a video network is an efficient video network administration staff able to monitor and correct difficulties that arise with video devices and video network so that users will feel comfortable relying on the video devices and video network for important communications.

Although the quality of video calls has improved with more reliable hardware and software components and with less expensive communication bandwidth, difficulties do arise during video conferences, such as video jitter, audio jitter, video latency and other synchronization or coding problems. Typically video network administrators man a telephone support center so that video conference participants that run into difficulties may call to seek help. Passive support centers that react to video conference participant complaints generally provides a slow response that tends to delay the progress of the video call and diminish the experience of participants. Further, video network administrators often face substantial challenges once a problem is brought to their attention. For instance, the administrators typically have to identify the video devices engaged in the video call in order to isolate the source of the difficulty and develop a solution. In complex video conferences that involve a number of video devices from a variety of manufacturers or internet based video devices such as modules running on servers that perform video functions, a network administrator may have to interact with a variety of individual device interfaces to solve a difficulty.

As another alternative, video network administration support sometimes participates in video conferences as an invisible participant and actively monitors their own connection to gauge the quality of service of the other participants are experiencing. Although some software solutions allow monitoring of an individual's own device in a video call for quality of service, that individual device's connection does not necessarily provide an indication of the quality of the entire video call as a whole. Thus, although video network administrators may spend substantial amounts of time actively monitoring video calls, problems with the video calls may still not be detected until another participant calls the support center. Further, active monitoring by video network administrators detracts from the privacy expected by participants to a video call and encourages individuals to view video conferencing as a less desired way to communicate where other alternatives exist for meeting, such as travel and a personal meeting.

SUMMARY OF THE INVENTION

Therefore a need has arisen for a system and method which actively monitors video devices to detect failures or difficulties that arise with the video devices.

A further need exists for a system and method which amalgamates video device call states to a video call state for a unified view of overall video call quality updated by active monitoring to identify failures or difficulties that arise with the video call.

In accordance with the present invention, a method and system are provided which substantially reduce or eliminate the problems and difficulties associated with previous methods and systems for monitoring video devices and video calls. A monitoring engine polls devices associated with a video call to obtain quality of service and/or state information of the devices. The monitoring engine generates an overall description of the video call and broadcast events of interest to clients monitoring the video call.

More specifically, a video network platform communicates initiation of a video call reservation to a monitoring manager. The monitoring manager creates a monitoring engine object for monitoring each video call with the monitoring engine keyed to the reservation. As a dialer of the video network platform connects each call segment between devices, the monitor engine creates a monitoring thread for each device keyed in a hashtable to the video call so that each device of the video call has an associated monitor thread. Each monitor thread periodically polls its associated device to obtain quality of service and state information and compares the polled information with threshold rules and state change rules to detect reportable events, such as a degraded video call quality or change in state of a video device which are broadcast to registered video network administrator monitor clients. The monitor engine is essentially a nested state machine with device state machines nested in device monitor state machines to track device connections, device monitor state machines nested in call segment state machines to track call segment connections, and call segment state machines nested in a call state machine to aggregate call quality and state information into an understandable overall picture.

The present invention provides a number of important technical advantages. One example of an important technical advantage is that video devices are actively monitored in an automated fashion to detect failures and problems that arise with the video devices. Video network administration support receives notice of failures or problems with video devices to proactively initiate solutions rather than waiting for participants of a video call to initiate a support request to a call center. Active monitoring identifies the video device and nature of the failure or problem with a uniform interface message to provide a more rapid and accurate support response, thus reducing the time and training generally needed of support staff to support multiple calls in a complex video network having a variety of different types of video devices manufactured by different manufacturers with disparate interfaces.

Another example of an important technical advantage is that video device call states are amalgamated to a video call state for a unified view of overall video call quality that is updated by active monitoring to identify failures or difficulties that arise with the video call. Each video device of a video call reports a subset of possible states to a common monitoring engine that provides a single unified state of the video call in a concise and understandable format. Failures, problems or simply changes to a video call state are broadcast to support staff, participants or others interested in an overall video call versus just individual video devices. Video network administration support is thus able to quickly obtain an overall view of the video call with aggregated video device call states and statistics for an overall view of quality of service of the video call to identify and solve video call problems, such as problems resulting from video device interaction difficulties.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Active video call monitoring reduces the time and complexity associated with supporting video calls with multiple video devices across a video network. The present invention monitors video calls by taking in a description of the video calls and, from the description, gathering information with periodic active polling of each video device of the video calls. Over the course of the video call, quality of service metrics gathered by routine polling are munged together to produce an overall picture of the video call and changes in the quality of the video call are broadcast to clients having a registered interest in knowing when video call quality changes. Problems or symptoms of problems forming in the video call may thus be proactively addressed to resolve the problems without intervention from video call participants by aggregating and interpreting video device call states and statistics to present an overall picture of the quality of a video call.

Figure 1:
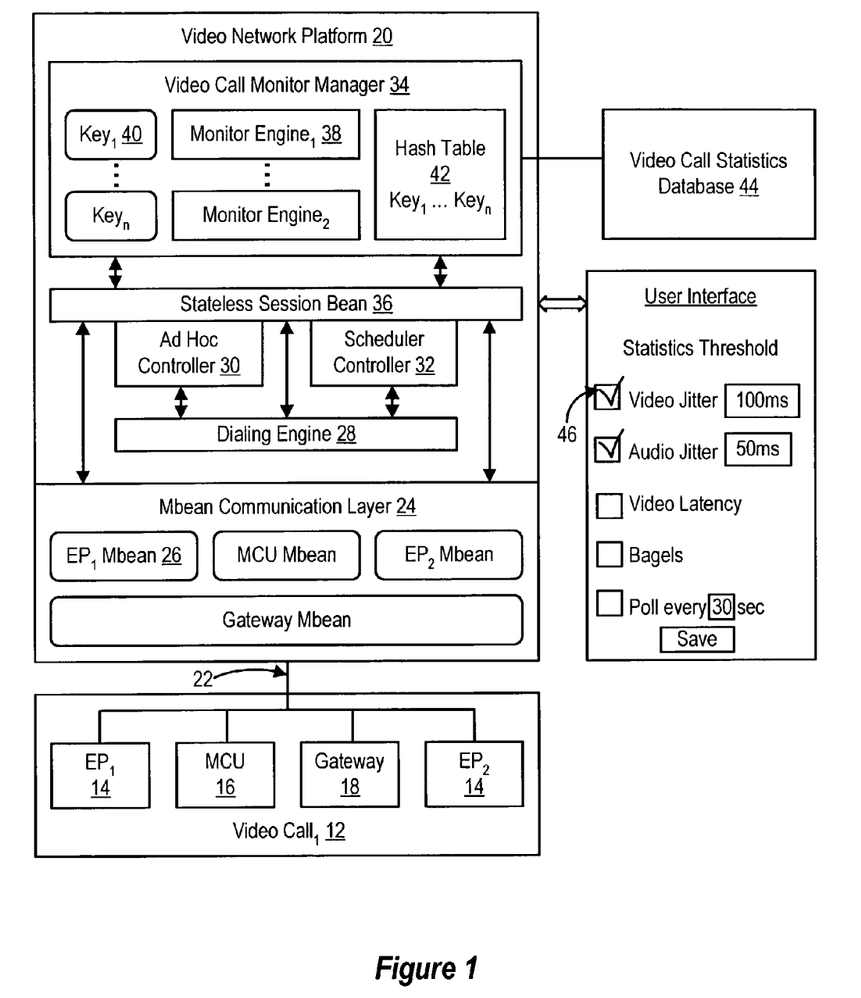
FIG. 1 depicts a block diagram of a system for active monitoring of video devices in a video call.

Referring now to FIG. 1, a block diagram depicts a system 10 for active monitoring of video devices in a video calls 12. An example of a video call 12 using video endpoints 14, an MCU 16 and a gateway 18 is depicted with monitoring of video call 12 provided by a video network platform 20. Video endpoints 14 capture and display audiovisual information for participants to video call 12 and communicate the audiovisual information to other video endpoints through a video network 22, such as with H.320 or H.323 standard communication protocols. MCU 16 coordinates communication of audiovisual information for video calls involving three or more endpoints 14, and gateway 18 converts audiovisual information between H.320 and H.323 protocols to support communication between endpoints 14 using different protocols. Video network platform 20 communicates with the video devices to gather status information, such as state and event information. For instance, video network platform 20 monitors connection state of video devices, including detailed state information such as jitter and latency, through an Mbean communication layer 24 that has an Mbean 26 for each video device to support communication between video network platform 20 and each video device native interface. Mbean communication layer 24 supports interaction of various modules of video network platform 20 with video device such as a dialing engine 28 that dials connections and disconnects existing connections between video devices according to instructions from an ad hoc controller 30 and a scheduler controller 32. Video network platform 20 generally communicates with individual video devices with each video device's manufacturer protocol and organizes state information received from video devices in a universal format for use by external devices.

Video network platform 20 includes a video call monitor manager 34 that is a single Java Class that communicates to other modules of video network platform 20 by presenting itself through a stateless session bean 36. Video call monitor manager 34 is a container which coordinates the activities for video calls 12 with a monitor engine 38 associated to each video call through a key 40 and hashtable 42. Each monitor engine 38 monitors a video call by controlling a set of threads group as logical calls with a thread for each video device of a video call. For each video call, a monitor engine 38 tracks dialing and hanging up of a video call by interfacing with ad hoc controller 30 or scheduler controller 32, and also tracks statistics for storage in a video call statistics database 44. Monitor engine 38 communicates with video devices of a video call 12 through Mbean communication layer 24 and with controllers of video call 12 that are associated with video network platform 20 to track quality of service metrics and distinguish desired actions that change a video device or video call state from undesired or unknown actions, such as actions initiated by outside agents like users or software.

The operation of video call monitor manager 34 is controlled through a user interface 46 supported by video network platform 20, such as through a scheduling interface for scheduling video calls 12 initiated with scheduler controller 32. A video network administrator or other user specifies monitored metrics of a video call 12, such as acceptable operation conditions and the frequency of polling for the metrics from video devices of the video call. For instance, in the example depicted by FIG. 1, a scheduler has selected polling every 30 seconds for statistics thresholds of 100 ms for video jitter and 50 ms for audio jitter and has left video latency and bagel statistics unselected. Monitor engine 38 associated with the video call will poll each video device every 30 seconds for video and audio jitter and will escalate monitoring of a video device that responds with statistics in excess of the selected thresholds. A variety of statistics may be included to define a superset of call quality metrics available from video devices with the selected attributes of interest to the user. Unselected metrics and video devices having metrics within the desired threshold may still be monitored for storage in video call statistics database 44 without impacting the monitoring of the video call. A given selection of call metrics may be saved as a profile for future use with other video calls.

Figure 2:
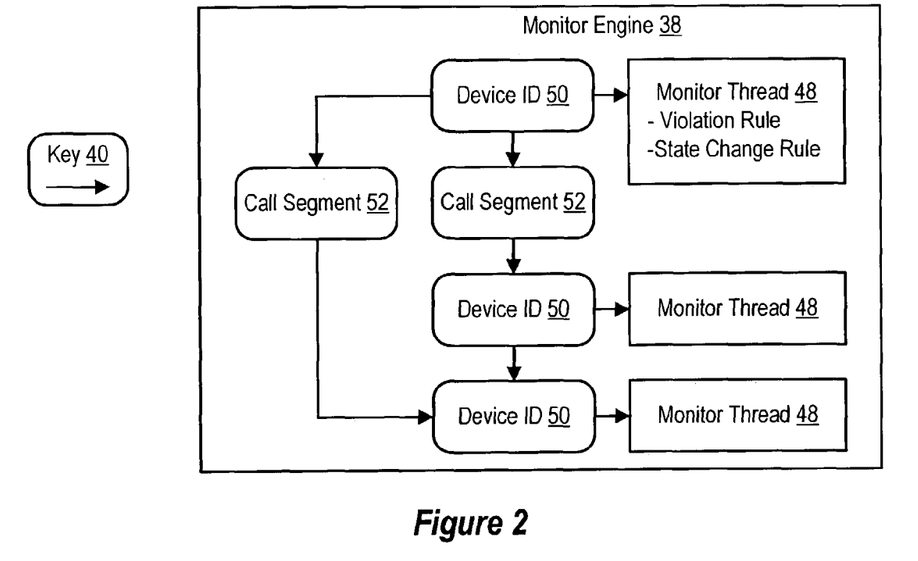
FIG. 2 depicts a block diagram of a monitor engine object that actively monitors a video call.

Referring now to FIG. 2, a block diagram depicts a monitor engine 38 having plural monitor threads 48 to monitor each video device of a video call identified by a device ID 50. Each monitor thread 48 compares information received from its respective video device against a violation rule and a state change rule to determine whether to issue a message for the video device through stateless session bean 36. Monitor engine 38 is an object generated by video call monitor manager 34 when a reservation for a video call is initiated by ad hoc controller 30 or scheduler controller 32. Dialing engine 28 passes the reservation to monitor manager 34 to indicate that it is about to start the video call associated with the reservation. Monitor manager creates a monitor engine 38 object for insertion to hashtable 42 keyed off of the reservation. As each video device is dialed, a call segment 52 is added to monitor engine 38 with a monitor thread 48 for the dialed video device by passing the key 40 and information of the video device of the added call segment from dialing engine 28 to monitor manager 34.

Monitor engine 38 monitors call segments by adding a monitor thread 48 for each video device of the call segment that monitor engine 38 is not currently monitoring. Each monitor thread 48 monitors the status of its associated video device by periodically obtaining device state and quality of service statistics polled from Mbean communication layer 24 device specific monitoring classes. The polled information for a video device is compared with the threshold and state change rules of the video devices monitor thread 48 to identify reportable events or information. For instance, if a monitor thread 48 detects a change in status, such a change from idle to connected for the video device, or a threshold violation, monitor thread 48 initiates broadcast of a message from monitor engine 38 to registered users to provide topics that explain what event occurred and the video call in which the event occurred. Monitor threads also collect statistics surrounding the quality of service of a video call for storage in video call statistics database of later use in CDR reports and graphs of video call and video device quality over time.

Figure 3:
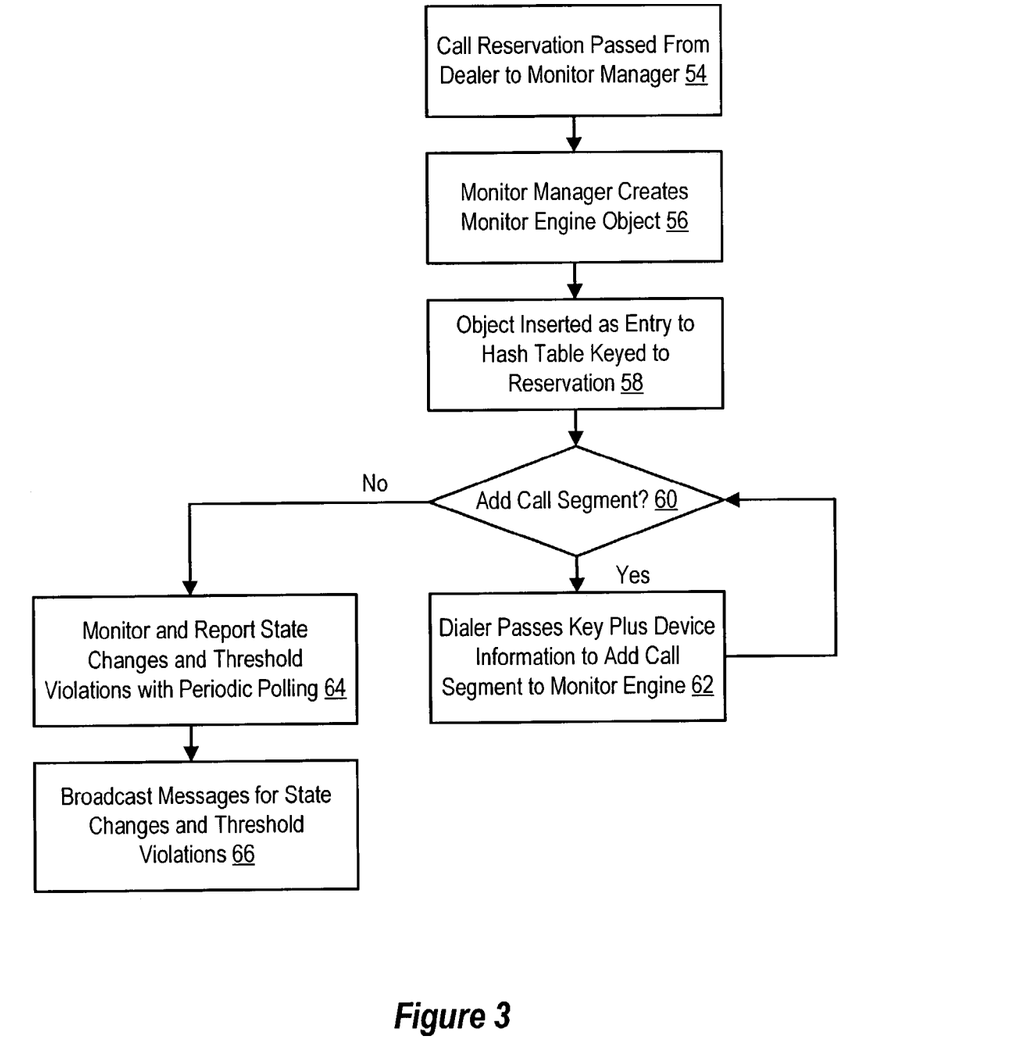
FIG. 3 depicts a flow diagram of a process for active monitoring of a video call between plural video devices.

Referring now to FIG. 3, a flow diagram depicts a process for establishing a monitor engine for a video call. The process begins at step 54 with the passing of a call reservation from a dialer to a monitor manager. At step 56, the monitor manager creates the monitor engine object keyed to the reservation for active monitoring of the video call. At step 58, the object is inserted as an entry to a hashtable keyed to the reservation for tracking the video devices associated with the video call. At step 60, a determination is made of whether a call segment will be added to the video call. If the dialer dials an additional video device into the video call, the process continues to step 62 at which the dialer passes the reservation key plus video device information for the dialed video device to the add the call segment to the monitor engine. If no additional call segments are added at step 60, the process continues to step 64 at which each monitor thread monitors information periodically polled from its associated video device for state changes and threshold violations. If a state change or threshold violation is detected, then at step 66 a broadcast message that identifies the video device and event is sent to interested users, such as a video network administrator tasked with proactively correcting difficulties that arise with the video call.

Figure 4:
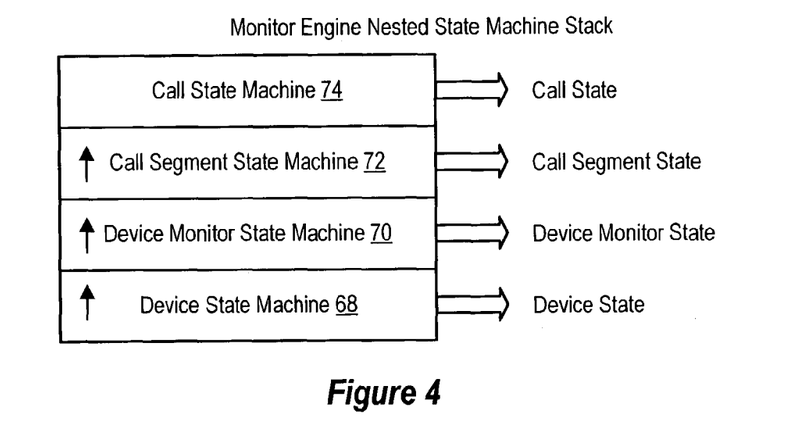
FIG. 4 depicts a block diagram of a monitor engine nested state machine stack.

Referring now to FIG. 4, a block diagram depicts one view of an embodiment of the monitor engine built as a monitor engine nested state machine stack for determining video call status. Device state machines 68 are nested within device monitor state machines 70 to monitor changes in states between related devices of the video call. Device monitor state machines 70 are nested within call segment state machines 72 to monitor changes in state between related call segments of the video call. Call segment state machines 72 are nested within a call state machine 74 to monitor changes in states of the video call. A call state machine is defined for each monitor engine to monitor a video call between video devices having device state machines of bottom stack.

Figure 5:
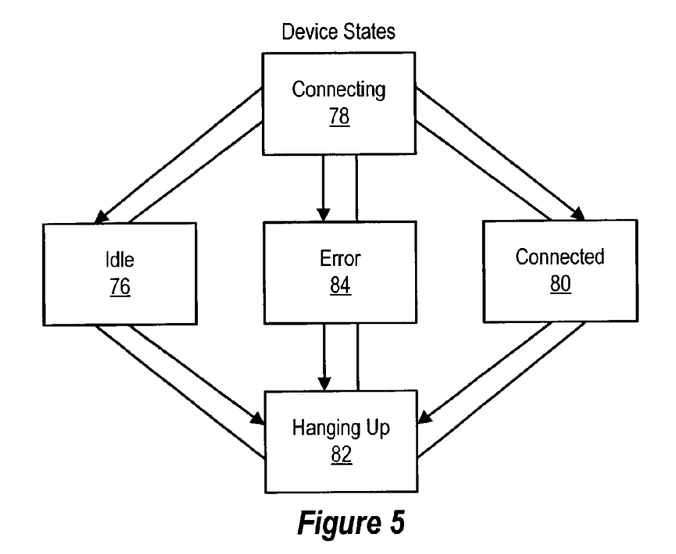
FIG. 5 depicts a block diagram of state transitions for a video device state machine.

The bottom stack is a device state machine 68 having the states illustrated in FIG. 5. Device state machine 68 detects changes in state of a given device from idle, connecting, connected, hanging up and error states. The idle state 76 occurs when the device is active but not in a call. The connecting state 78 occurs when the device is in the progress of connecting to a call. The connected state 80 occurs when the device is in a call. The hanging up state 82 occurs when the device is disconnecting from a call. The error state 84 occurs when the device has reported an error. The device states are retrieved from native device interfaces through the Mbean communications layer and reported to the monitor thread for each device.

Figure 6:
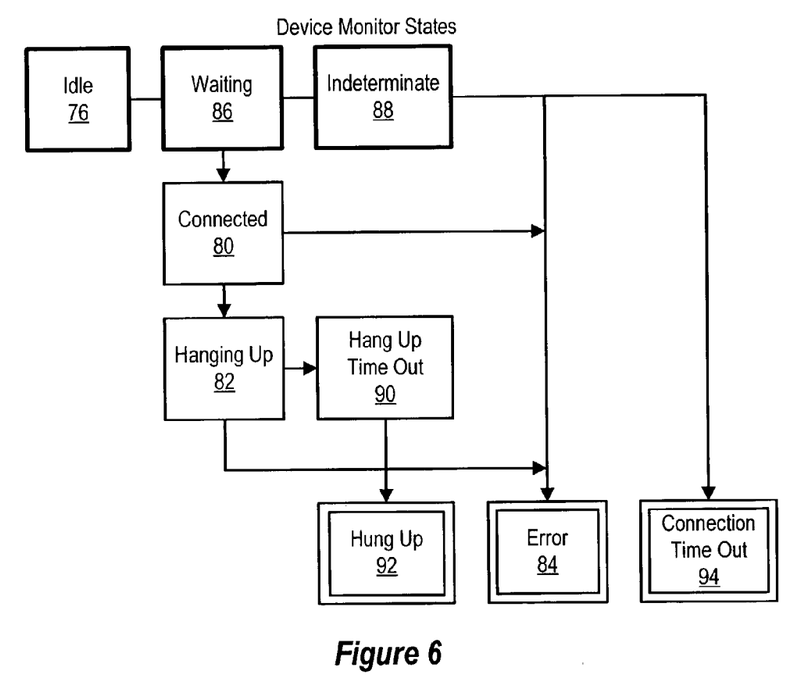
FIG. 6 depicts a block diagram of a device monitor state machine.

Device monitor state machine 70 is in the monitor engine thread of each respective device and depends on the device states and also a connection and disconnection timer for timeouts and dialing results of devices involved in a call segment. FIG. 6 depicts device monitor state machine states and transitions with valid transitions following arrowed lines downward and to the right from initial to final states. From idle state 76, a device transitions to a waiting state 86 to either a connected state 80 or an indeterminate state 88 in which no connection is detected. The indeterminate state transitions to a connection time out state 94 if a time out occurs or to error state 84 if an error in the connection is detected. From the connected state 80, transitions occur to a hanging up state 82 if a hang up is commanded or to error state 84 if an error occurs in the connection. From hanging up state 82 a transition is made to a hang up timeout state 90 and hung up state 92 or, if an error occurs, to error state 84. Indeterminate state 88 occurs if the device is an external device whose status cannot be determined. Hanging up timeout state 90 occurs if the device was successfully instructed to hang up but did not hang itself up. Connection timeout state 94 occurs if the device was successfully dialed but never connected. Error state 84 occurs if the device reported an error state, was not idle when a dial attempt occurred to the device, experienced an error when a dial attempt was made, experienced a communication error or had a device on the other end of a call that was not able to be dialed.

Figure 7:
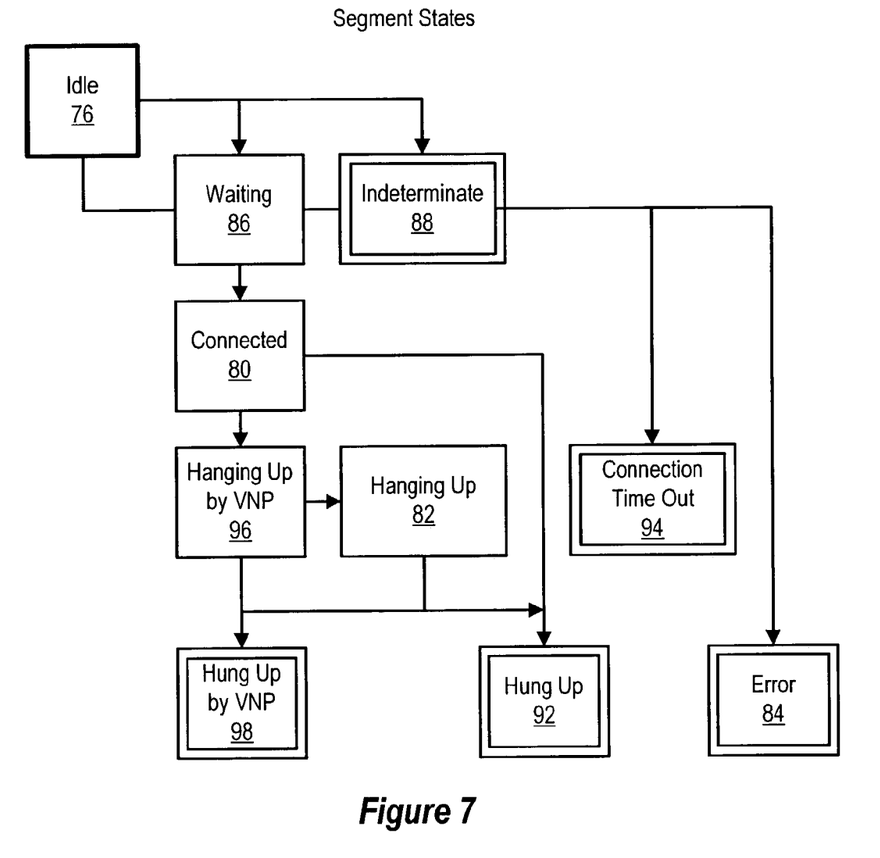
FIG. 7 depicts a block diagram of a video call segment state machine.

Call segment state machine 72 is the call segment of the monitor engine between two or more monitor threads and acts to amalgamate two device monitor thread states to track the status of a call segment. Call segment state machine initiates in idle state 76 waiting for both of the call segments devices to report connected and transitions to a waiting state 86 in which one or both devices of a call segment are in a waiting state. From waiting state 86, a transition to indeterminate state 88 occurs if both devices are indeterminate and then transitions to connection timeout state 94 if a time out occurs or error state 84 if an error is reported. If only one device is indeterminate then the indeterminate device assumes the state of the other device of the call segment. From waiting state 86, a transition to connected state 80 occurs if both devices reported connected and to hung up state 92 if one or both devices were hung up from a command outside of the video network platform. From connected state 80, a transition to hang up by VNP state 96 occurs if both devices of the call segment are hanging up under control of the video network platform followed by a transition to hung up by VNP state 98 once both devices report as hung up.

Figure 8:
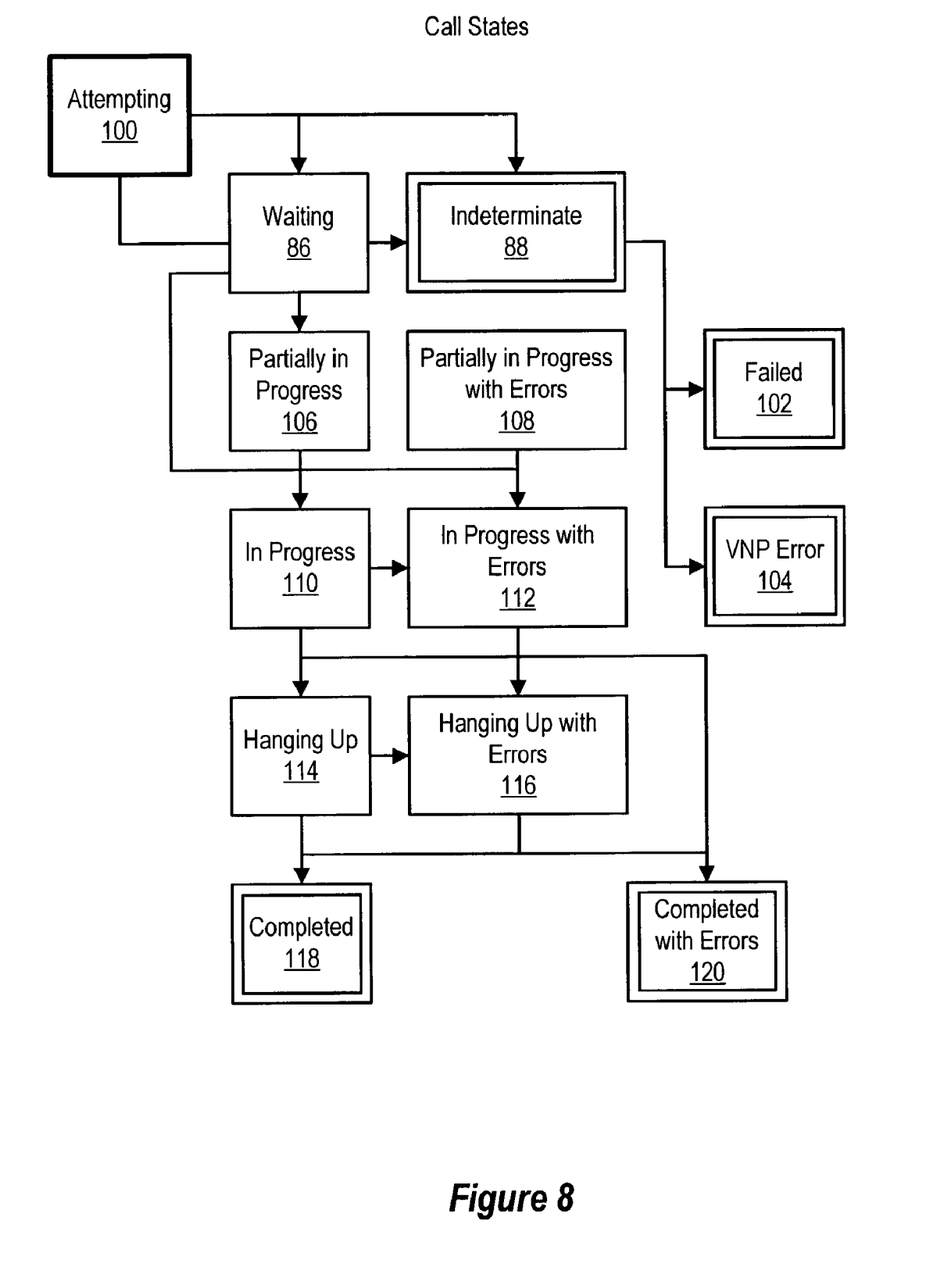
FIG. 8 depicts a block diagram of a video call state machine.

Call state machine 74 munges the call segment state machines 72 together to create a single call state for the video call. Call state machine 74 simplifies the creation of a single call state by taking the possible call segment states and determining for each possible call segment state whether a call segment is or is not in that call segment state. Call state machine 74 bases the call state determination on Boolean values that total the number of possible call segment states to determine if a segment is in each of the segment states instead of an unknown number of segments' states. Call state machine 74 initiates in an attempting state 100 in which the video network platform dialing engine is dialing the video call with no call segments in the connected state. From attempting state 100, call state machine 74 transitions to waiting state 86 in which all call segments are waiting instead of idle or indeterminate state 88 in which call status is not determinable due to the use in the video call of all external video devices. Call state machine 74 transitions to failed state 102 if all call segments have an error or connection timeout or to a VNP error state 104 if an error or errors occurred during dialing of call segments that are not related to the devices being busy. Once one or more call segments are established, call state machine 74 transitions to a partially in progress state 106 as some segments are connected while others are idle and to a partially in progress with errors state 108 if some segments are connected, some are idle and some are in either an error or connection time out state. If all call segments successfully connect, call state machine 74 transitions to in progress state 110 and, if an error or time out occurs with at least one segment, to in progress with errors state 112. From in progress state 110, call state machine 74 continues to hanging up state 114 if the video network platform commands hang up of the video devices without errors and to completed state 118 once hang up is complete. From in progress with errors state 112, call state machine 74 continues to hanging up with errors state 116 and completed with errors state 120. In alternative embodiments, the call monitoring engine may munge alternative states and communication devices other than video devices, such as conference telephone communication devices.

Although the present invention has been described in detail, it should be understood that various changes, substitutions and alterations can be made hereto without departing from the spirit and scope of the invention as defined by the appended claims.

What is claimed is:

1. A system for monitoring video calls, the system comprising:
   plural video devices interfaced with each other and operable to communicate video calls;
   a video network platform interfaced with the video devices and operable to communicate control, quality and state information with the video devices; and
   a monitor manager associated with the video network platform and operable to generate a monitor engine software object at the monitor manager for each video call when a video call reservation is initiated by a scheduler, the monitor engine software object generating a monitor software thread at the monitor manager associated with each video device contacted to establish the video call, the monitor software thread operable to periodically poll a multipoint control unit (MCU) or a gateway contacted to establish the video call to obtain the quality and state information, the monitor software thread further operable to identify selected events associated with the video call from the quality and state information and to broadcast a message that identifies the MCU or the gateway as a source of degraded video quality in the video call based on the obtained quality and state information obtained from the MCU or the gateway.

2. The system of claim 1 wherein the quality information comprises video jitter and the selected event comprises a video jitter threshold associated with one or more of the video devices.

3. The system of claim 1 wherein the quality information comprises audio jitter and the selected event comprises an audio jitter threshold associated with one or more of the video devices.

4. The system of claim 1 wherein the quality information comprises video latency and the selected event comprises a video latency threshold associated with one or more of the video devices.

5. The system of claim 1 further comprising a user interface in communication with the monitor manager and operable to select a quality information threshold and polling frequency.

6. The system of claim 1 wherein each monitor engine software object comprises as nested state machine operable to monitor the video call.

7. The system of claim 6 wherein the video call comprises plural call segments, each call segment having plural video devices and wherein the nested state machine comprises:
   a device state machine associated with each device and operable to detect device state changes;
   a device monitor state machine interfaced with each device state machine and operable to apply the device states to detect device connection states;
   a call segment state machine associated with each call segment and interfaced with the device monitor state machines of the call segment, the call segment state machine operable to apply the device monitor states to detect call segment states; and
   a call state machine interfaced with the call segment state machines and operable to apply the call segment states to detect a call state.

8. The system of claim 1 wherein the video network platform further comprises a dialer operable to control connecting and disconnecting the video devices, and wherein the monitor manager interfaces with the dialer to create a monitor software thread for each dialer operation connecting video devices.

9. A computer implemented method for monitoring video calls, the method comprising:
   detecting, at a monitor manager device, initiation of a video call reservation having plural video devices organized as plural call segments;
   temporarily creating a monitor engine software object having a key referenced to the reservation at the monitor manager device;
   creating, at the monitor manager device, a monitor software thread for each video device contacted to establish to the video call, the monitor software threads associated to the video call with the key;
   periodically polling, at the monitor manager device, a multipoint control unit (MCU) or a gateway contacted to establish the video call with the monitor software threads to detect predetermined events related to call quality and state information; and broadcasting, at the monitor manager device, a message that identifies the MCU or the gateway as a source of degraded video quality in the video call based on the obtained quality and state information obtained from the MCU or the gateway.

10. The method of claim 9 wherein periodically polling further comprises:

obtaining predetermined quality of service information with each monitor software thread for each associated video device; and comparing the obtained quality of service information with a predetermined quality of service threshold to detect video connections having degraded quality.

11. The method of claim 10 wherein the quality of service information comprises video jitter.

12. The method of claim 10 wherein the quality of service information comprises audio jitter.

13. The method of claim 10 wherein the quality of service information comprises video latency.

14. The method of claim 10 further comprising:

selecting one or more quality of service thresholds for a video call; and selecting polling frequency of monitor software threads associated with the video call.

15. The method of claim 9 wherein periodically polling further comprises:

obtaining predetermined video device state information with each monitor software thread for each associated video device; and organizing the obtained state information as call segment states aggregated to determine a video call state.

* * * * *